United States Patent [19]
Morey

[11] 3,877,578
[45] Apr. 15, 1975

[54] SEPARATION PROCESS FOR FLINT, AMBER, AND GREEN GLASS PARTICLES FROM A MIXTURE OF THE THREE COLORS

[75] Inventor: Booker W. Morey, Pasadena, Calif.

[73] Assignee: Occidental Petroleum Corporation, Los Angeles, Calif.

[22] Filed: Sept. 18, 1972

[21] Appl. No.: 290,064

[52] U.S. Cl.............................. 209/215; 209/223 R
[51] Int. Cl. ............................................. B03c 1/00
[58] Field of Search .......... 209/212, 214, 227, 213, 209/223, 215

[56] References Cited
UNITED STATES PATENTS

| 653,342 | 7/1900 | Gates | 209/212 |
|---|---|---|---|
| 731,045 | 6/1903 | Gates | 209/212 |
| 1,024,109 | 4/1912 | Troy | 209/212 |
| 1,463,713 | 7/1923 | Mondey | 209/227 |
| 1,956,760 | 5/1934 | Forren | 209/212 |
| 2,056,426 | 10/1936 | Frantz | 209/214 X |
| 2,065,460 | 12/1936 | Johnson | 209/214 |
| 2,487,272 | 11/1949 | Price | 209/212 |
| 3,289,836 | 12/1966 | Weston | 209/214 |

FOREIGN PATENTS OR APPLICATIONS

| 426,860 | 4/1935 | United Kingdom | 209/227 |

OTHER PUBLICATIONS
Bulletin Amer. Ceramic Soc., May 1934, Vol. 13 pg. 126–128.

*Primary Examiner*—Robert Halper
*Attorney, Agent, or Firm*—Christie, Parker & Hale

[57] ABSTRACT

Mixtures of particulate glass are separated into their species by magnetic forces or a combination of magnetic and acceleration forces such as gravity or centripetal acceleration.

11 Claims, 8 Drawing Figures

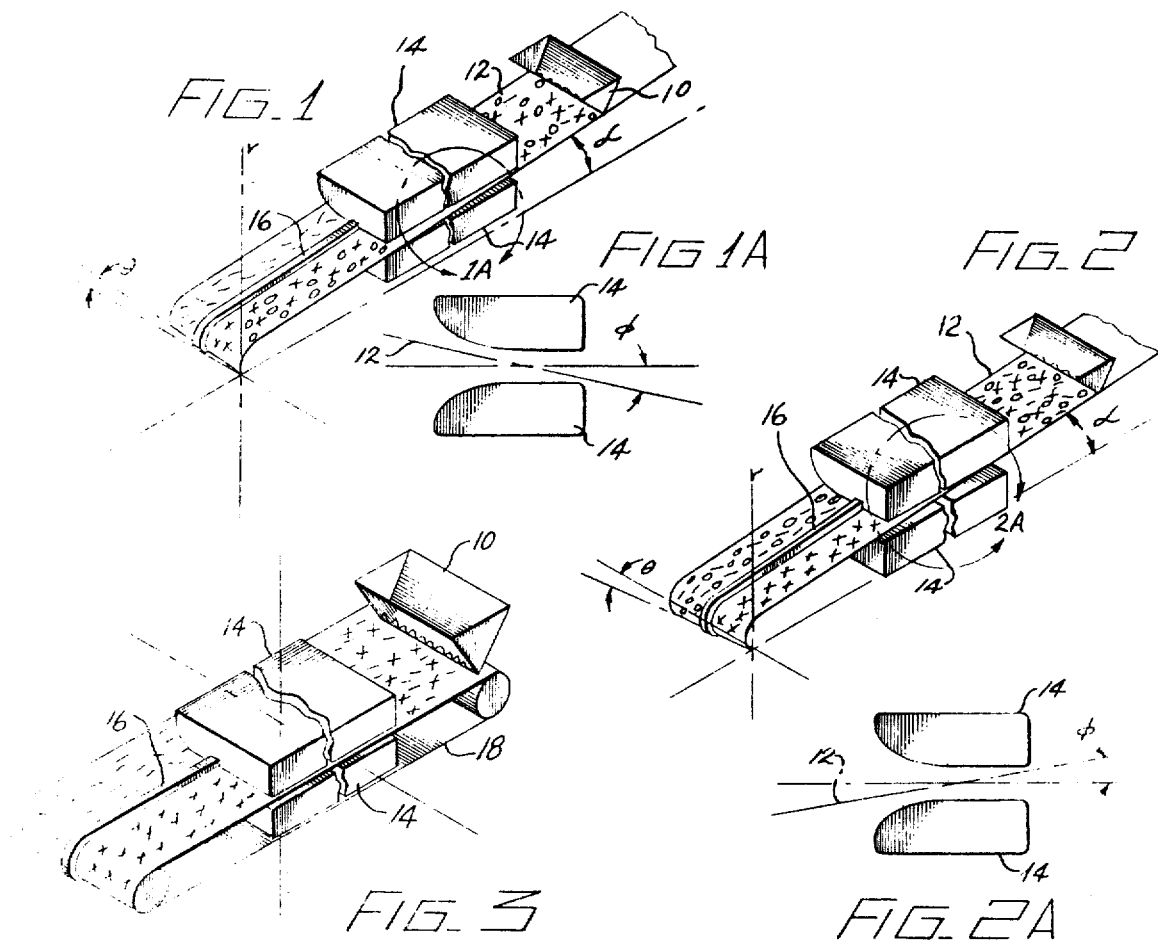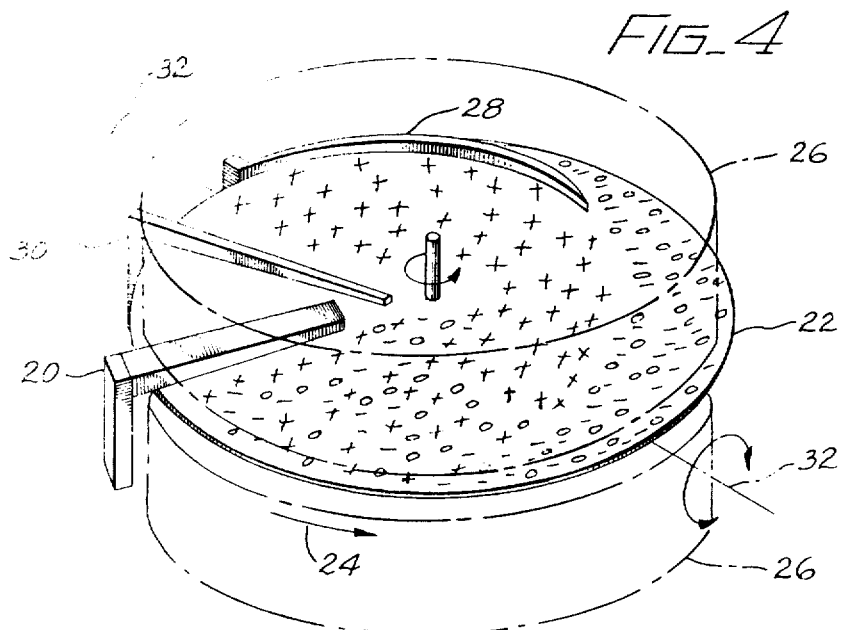

SEPARATION PROCESS FOR FLINT, AMBER, AND GREEN GLASS PARTICLES FROM A MIXTURE OF THE THREE COLORS

BACKGROUND OF THE INVENTION

To meet the evergrowing problem of disposal of solid wastes, municipalities are giving major consideration to recovering values contained within the waste for resale to offset the cost of waste collection and processing. Organic matter such as paper may, for instance, be repulped to form reusable paper stock. Iron may be separated magnetically, and other metals can be isolated by crushing and grinding, followed by size and/or heavy media separations.

The majority of the glass contained in the waste may be reduced to a particulate size ranging from about 20 to about 200 mesh in passing through various crushing and grinding operations used in waste reclamation. This glass residue is a mixture of fragments of the various glass species which exist in the solid waste fed to the reprocessing operation.

The glass particles may be separated from a mixture of particles of similar size of other materials by a flotation separation using a primary amine such as the reaction product of tall oil and diethylene triamine. The resultant float mixture of glasses generally contains particles of iron-like slag which is separated by conventional magnetic means.

The resultant mixture of glass particles, purified of non-glass particles, when melted gives a color ranging from approximately "Georgia green" to amber, depending upon the ratio of colors in the solid waste and the furnace conditions. While this glass can be recycled directly to a green or amber furnace, inconsistency in the color over a period of months will require limited substitution of the glass mix for normal cullet in color glass furnaces. Since colorless glass accounts for about 60% of new bottles manufactured, larger markets are available for color-sorted glass than for mixed colors cullet. Finally, color sorted cullet demands a premium price in addition to its ready marketability.

SUMMARY OF THE INVENTION

According to the present invention, there is provided a process for separating a mixture of comminuted glass particles according to their magnetic properties. This is accomplished, depending upon the mixture being processed, by the use of magnetic forces alone or magnetic forces in combination with acceleration forces.

The process generally involves passing the mixture of glass particles through a magnetic field in which a magnetic force gradient exists transverse to the path of travel. Glasses which are paramagnetic and therefore magnetically attracted segregate from the mass in the direction of the increasing magnetic gradient. Glasses which are diamagnetic and therefore magnetically repelled are separated in the opposite direction. Particles of glass which are magnetically neutral or nonmagnetic may be separated with either the paramagnetic or diamagnetic glasses by gravitational forces alone depending on the orientation of the means for conveying the particles relative to the horizontal.

Gravitational forces achieved as a consequence of tilt of a conveyor relative to the horizontal may be employed as a force to direct separation of magnetically neutral glasses from magnetically responding glasses. The glasses to be separated may be conveyed to the magnetic field by an endless moving belt or by a relatively smooth fixed conveyor which is tilted with respect to the horizontal and vibrated to achieve particle motion. The speed of the belt or tilt of the conveyor determines the rate of glass transport through the magnetic field and can affect the fineness of separation achieved in any given pass.

THE DRAWINGS

FIGS. 1 and 1A illustrate an apparatus for practice of this invention in which mixtures of particulate glasses are fed through a magnetic field and paramagnetic and neutral glasses are separated from diamagnetic glasses by tilt of the conveyor and magnetic forces.

FIGS. 2 and 2A illustrate the reverse operation in which paramagnetic glasses are separated from a mixture of diamagnetic and magnetically neutral glasses by reverse tilt of the conveyor.

FIG. 3 is an illustration of a system for separating diamagnetic glasses from paramagnetic glasses in which all gravitational influences are eliminated since neutral glasses are absent and a moving endless belt is used to convey the particulate mixture of glass through a magnetic field.

FIG. 4 is an alernative method of achieving glass separation using a turntable and centrifugal, gravitational, and magnetic forces are combined to achieve a separation of the different glasses.

DESCRIPTION

Figure 5:
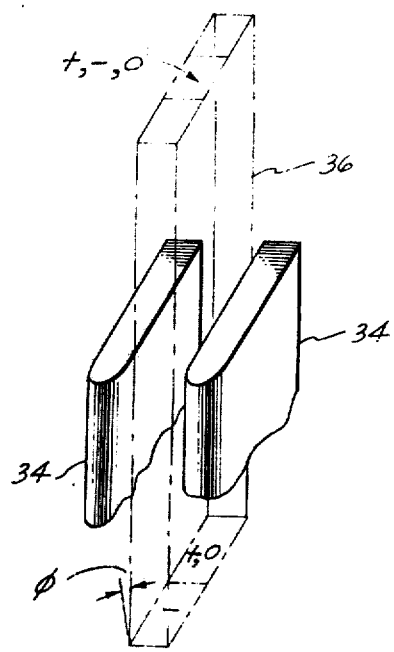
FIG. 5 illustrates another embodiment of a magnetic separator for glass particles having different susceptibilities wherein a magnetic force gradient is established traverse to a generally vertically downward flow path.

According to the present invention there is provided a process for separating a mixture of glass particles according to their magnetic properties.

As used herein, the term "paramagnetic glass" is used to describe glasses which are attracted towards a strong magnetic field and such particles are illustrated schematically in the drawings by a "+". Typical of such glasses are what is generally known in the trade as "green" glass.

The term "diamagnetic glass" means glasses which are repelled by a magnetic field and which are illustrated schematically in the drawings with a "−". Such glass includes, among others, colorless or "flint" glass.

As used herein, "magnetically neutral" glasses are those which are not materially affected by the presence of a magnetic field and are illustrated schematically in the drawings with an "o". Representative of neutral glasses are what is known to the trade as amber glass.

With reference now to FIGS. 1 and 1A, there is provided a system whereby diamagnetic glass particles are separated from a mixture of paramagnetic glasses and magnetically neutral glasses by a combination of magnetic and gravitational forces.

Hopper 10, preferably a conventional vibrating hopper or a hopper which dispenses glass particles to a vibrating conveyor, contains a mixture of diamagnetic, paramagnetic and neutral glass particles, preferably crushed to a particle in the size range of from about 32 to about 200 mesh. Hopper 10 distributes the glass particles onto conveyor 12 inclined or tilted at some angle α with respect to the horizontal. The degree of tilt and the relative smoothness of conveyor 12 determines the rate at which the glass particles slide down the conveyor. A conventional electromagnet has a pair of pole pieces 14 above and below the conveyor shaped to provide a magnetic force gradient transverse to the path of travel of the glass particles.

The magnetic pole pieces 14 and conveyor chute 12 in FIG. 1 are relatively long as compared with their width so that the particles of glass travelling along the conveyor are subject to the influence of the magnetic field for a substantial period of time. This assures that the magnetic and gravitational forces acting on the individual particles can effect separation despite chance collisions between particles as they travel along the conveyor. In addition, it may be desirable to apply a small amplitude vibratory force to the conveyor chute so that the small particles do not stick to it and are kept in motion along the conveyor. Typically, to avoid inducing any undesirable lateral accelerations, the vibration is applied longitudinally along the length of the conveyor rather than in a direction transverse to the flow of particles.

As illustrated in FIG. 1A, the pole pieces 14 of the electromagnet are asymmetrical in a direction transverse to the direction of flow of particles. In the illustration of FIG. 1A, the particles would flow into or out of the plane of the paper. The pole pieces are relatively close together adjacent one edge of the flow path of particles and are spaced further apart adjacent the other edge. The magnetic flux is higher where the pole pieces are closely spaced and decreases as the pole pieces become more widely spaced apart. Thus, the magnetic field strength has a gradient transverse to the direction of particle travel, being relatively strong near one edge and relatively weak near the opposite edge.

Referring again to FIG. 1, the conveyor chute 12 is lateral tilted relative to the horizontal about an axis running along the length of the chute by a small angle $\theta$ by raising the right side of the conveyor chute 12 relative to the left and/or lowering the left side of the conveyor chute 12 relative to the right. Thus, in the arrangement illustrated in FIG. 1, absent any magnetic field, particles moving along the length of the chute conveyor 12 would tend to drift left and come off of the end of the chute towards the left-hand side under the combined influences of the tilt through angles $\alpha$ and $\theta$.

In this arrangement, as the glass particles advance through the magnetic field between the pole pieces 14, they separate under the combined influences of the magnetic field and gravity. The diamagnetic clear glass particles are repelled by the magnetic forces which are stronger nearer the left side of the chute, which is at a slightly lower elevation and weaker near the right side which is at a slightly higher elevation. The magnetic repulsion partially overcomes the gravitational force imposed by the small angle of tilt $\theta$ about a line running along the length of the chute. Because of this, the diamagnetic particles do not move to the left side of the conveyor with the neutral and paramagnetic glass particles. A mechanical divider 16 in the form of a raised region on the chute commences near the downstream edge of the pole pieces and continues to the end of the conveyor chute. The divider mechanically separates the two streams of glass particles so that the diamagnetic particles flow along the uphill side of the divider and the paramagnetic and neutral glass particles flow along the downhill side of the divider. Thus, at the foot of the conveyor chute 12, the diamagnetic particles of amber glass are separated from the paramagnetic green and neutral amber particles. The paramagnetic particles are attracted towards the stronger magnetic field at the left side of the conveyor and, if desired, a pair of dividers may be provided near the downstream end of the conveyor so that separation of the paramagnetic particles from the neutral particles can also be obtained.

Referring now to FIGS. 2 and 2A, there is illustrated what is in effect the reverse of the separation illustrated in FIGS. 1 and 1A. The apparatus is the same except that the conveyor chute 12 is tilted with its right side down by a small angle $\theta$ relative to the horizontal. Thus, the uphill edge of the conveyor chute 12 passes through the relatively stronger magnetic field between the pole pieces 14 and the relatively lower side edge passes through the weaker magnetic field. Since the paramagnetic green glass particles are attracted towards the stronger magnetic field, they drift towards the uphill or left edge of the divider 16 and the diamagnetic and neutral glass particles pass along the downhill edge of the divider.

In a typical embodiment, the angle $\theta$ which induces the glass particles to move along the length of the conveyor is in the range of from about 6 to 20 degrees above the horizontal. When the angle is relatively low, the glass particles move more slowly and are subjected to the influence of the magnetic field for a longer period of time. Because of this, a rather high degree of separation is possible. When the angle of tilt of the conveyor chute is relatively higher, glass particles move through the magnetic field more rapidly and, hence, a higher flow rate through the process can be obtained. The faster moving particles are, however, subject to the magnetic field for a shorter time and, hence, the degree of separation achieved is diminished. Typically, the lateral tilt of the conveyor chute is in the order of from about one-half to one degree from the horizontal. It will be apparent that the gravitational forces acting on the particles are relatively small. It should also be noted, however, that the difference in magnetic susceptibility between green, clear and amber glass is rather small and the particle size of the glass preferred in practice of this invention is also small. Since such small forces are involved, separations by the magnetic field are practical.

It has been known in the past that green glass could be separated from a mixture of flint and amber glass using an extremely high intensity induced roll magnetic separator of the type that can be used for removing iron rich slags from glass. Separations of flint and amber glass, even at high magnetic fields, have not been feasible with such an arrangement. Thus, a technique such as illustrated in FIG. 1 wherein the diamagnetic flint glass is separated from the mixture of paramagnetic green glass and neutral amber glass provides an effective separation never before available.

Referring now to FIG. 3, a more simple separation is feasible when a mixture of diamagnetic flint glass and paramagnetic green glass is to be separated. As illustrated in this embodiment, the feeder 10 distributes glass particles on an endless belt 18 which preferably has a smooth low friction upper surface. The belt moves between a pair of opposed pole pieces 14 of an electromagnet, the pole pieces being substantially like those shown in FIGS. 1A and 2A. These pole pieces 14 establish a magnetic field gradient transverse to the path of travel of the glass particles. The diamagnetic flint glass is repelled by the strong magnetic field and passes to the right of the divider 16 and the paramagnetic green glass is attracted to the stronger portion of the magnetic field and passes to the left of the divider 16 to effect a mechanical separation. Clearly, if desired, a lateral tilt of the conveyor may be used to enhance the degree of separation.

An apparatus as illustrated in FIG. 3 may also be employed for separation of a mixture of diamagnetic, neutral, and paramagnetic glass particles by providing a second divider (not shown) dividing the belt into three zones, a right-hand zone into which the diamagnetic particles are repelled, a left-hand zone into which the paramagnetic glass particles are attracted, and a central zone in which predominately neutral glass particles are collected. Since gravitational forces are eliminated in such an arrangement, the degree of separation is not as fine and some neutral glasses are typically present with both the paramagnetic and diamagnetic materials. Serial separations of the separate fractions can be used for greater refinement.

If desired, the upper surface of the belt 18 may be bowed so as to be slightly concave to reimpose the gravitational forces on the glass particles travelling on the belt. In such an arrangement, the neutral glass particles tend to settle toward the center of the belt due to gravitational forces while the diamagnetic and paramagnetic glass particles are urged towards the opposite edges of the belt by the magnetic forces.

FIG. 4 illustrates still another apparatus useful for separating glass particles having differing magnetic susceptibilities. In this arrangement, a feeder 20 feeds the mixture of glass particles to a turntable 22 rotatable about its own axis in a direction as indicated by the arrow 24. The pole pieces 26, shown only in phantom in FIG. 4, are arranged on opposite sides of the rotatable turntable. The pole pieces are crowned so as to be relatively closer together near the center of the turntable so that the magnetic field strength is highest near the middle and relatively lower near the periphery. A divider gate 28 on the far side of the turntable from the feed hopper 20 serves to divide the flow of particles on the face of the turntable into two streams, one relatively near the center and the other relatively near the periphery. The stream outward from the gate 28 is forced off the periphery of the turntable, a deflector 30 clears the stream near the center of the disk before it again reaches the feeder 20.

The glass particles on the turntable tend to segregate under the influence of the combined magnetic and centrifugal forces. The centrifugal forces tend to urge all of the particles toward the periphery of the disk. The paramagnetic particles are, however, attracted to the stronger magnetic field near the center of the disk so that the centrifugal force is resisted and segregation of the paramagnetic particles from the diamagnetic and neutral particles is obtained. In the arrangement illustrated, the paramagnetic particles are cleared from the turntable by the barrier 30 and the diamagnetic and neutral particles are removed by the gate 28.

The separation between the glass particles with differing magnetic susceptibilities can be enhanced by tilting the turntable 22 around a horizontal axis 32 about 90 degrees away from the feeder 10. Such tilting of the turntable by a very small angle adds a gravitational component to the centrifugal and magnetic influences in separating the diamagnetic and neutral glasses from the paramagnetic glass particles. To effect such separation, the glass particles from the hopper 20 are fed onto the turntable near its relatively higher side. By tilting the turntable about the axis 32 in the opposite direction so that the hopper is nearer the low side, the neutral glass particles may be combined with the paramagnetic glass particles and removed between the gates 28 and the barrier 30 rather than off of the periphery of the disk with the diamagnetic glass particles.

Similarly, if desired, the influence of centrifugal and gravitational forces in combination with the magnetic forces can be modified by slightly crowning the turntable to tend to disperse the neutral particles radially outwardly or, if desired, a slightly concave turntable may be used to urge the neutral particles relatively inwardly. This is typically not as satisfactory, however, since it merely counteracts the centrifugal forces and the degree of separation obtained is not as sharp.

It will be noted that both gravity and rotation of the turntable are techniques for imposing an acceleration on the glass particles having a component in a direction transverse to the path of travel of the glass particles. This acceleration is superimposed on the magnetic field in a direction whereby the magnetic field tends to counteract the acceleration for glass particles having a particular magnetic susceptibility. Thus, for example, when diamagnetic glass particles are separated from a mixture that includes neutral and paramagnetic particles, the acceleration urges all of the particles towards one side edge of the path of travel of the particles and a magnetic field which repels the diamagnetic particles urges only those toward the opposite side edge of the path, thus the paramagnetic and neutral particles tend to concentrate nearer the side edge where urged by the acceleration. The diamagnetic particles tend to accumulate toward the opposite side edge due to the magnetic field counteracting the acceleration.

Gravity and the centripetal acceleration of rotation are quite convenient for obtaining an acceleration transverse to the principal path of travel of the glass particles. When gravity is used to move the particles along a chute, for example, lateral tilting of the chute provides a small component of gravity transverse to the chute and urges the particles toward one edge. Similarly, rotation of the turntable urges all the particles towards the periphery.

FIG. 5 illustrates another embodiment of separator for glass particles having differing magnetic susceptibilities. As illustrated in this embodiment, a pair of magnetic pole pieces 34 are arranged on either side of a generally vertically downward flow path 36. The pole pieces are relatively nearer together near one edge of the flow path and relatively further apart near the opposite edge so as to establish a magnetic force gradient transverse to the vertical flow path therebetween. In the illustrated arrangement, the pole pieces are closer together near the further edge of the flow path and further apart near the forward edge of the flow path.

A mixture of glass particles, including diamagnetic, neutral and paramagnetic glasses is fed into the top of the flow column in its center one-third to one-half, these particles flow downwardly along the column 36 and are influenced by the magnetic field between the pole pieces. At the bottom, the flow column can be considered to be divided into two zones, one of which near the edge of the flow path where the pole pieces are closer together would be relatively rich in paramagnetic glass particles, the other zone beneath the divergent edges of the pole pieces will be relatively richer in the diamagnetic glass particles. If the flow path 36 is exactly vertical, the neutral glass particles will travel straight down and be divided between the paramagnetic and diamagnetic particle zones. If, on the other hand, the flow zone is tilted through a small angle $\phi$, the neutral particles will be biased towards one zone, such as, for example, illustrated in FIG. 5 along with the paramagnetic particles. Clearly, tipping the vertically extending flow path in the opposite direction can influence the neutral particles to be separated with the diamagnetic particles.

Typically, glass particles falling freely or in air through the magnetic field between the pole pieces 34 may descend too rapidly to be affected by the magnetic field gradient. It is, therefore, desirable to provide a somewhat more dense and viscous fluid in the flow path 36 to slow the rate of descent. Further, the separation can be aided by gravity by tilting the vertically extending flow through a small angle $\phi$, a steady laminar flow of fluid along the flow path may be desirable. When a fluid having a greater viscosity than air is used in the flow path, the influence of particle size becomes of more significance and it may be desirable to effect a size segregation of the glass particles before feeding them through the magnetic field gradient.

Figure 6:
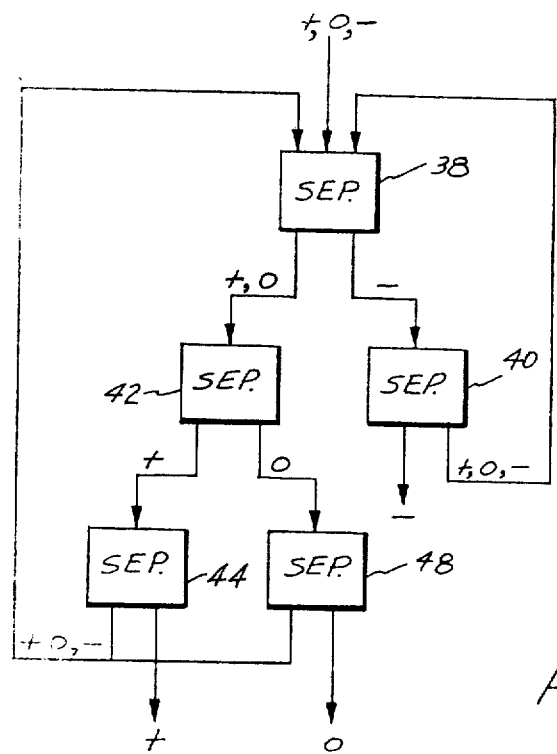
FIG. 6 illustrates diagrammatically a plurality of glass separations operating in accordance with the principle of this invention.

FIG. 6 illustrates in block form a glass separation process operating according to principles of this invention. As illustrated in this embodiment, a mixture of glass particles of differing magnetic susceptibilities indicated by the symbols +, $o$ and − is fed into a separator 38 of a type employing a combination of magnetic and gravitational or centrifugal forces as hereinabove described and illustrated. After separation in the separator 38, the diamagnetic particles − flow to a second separator 40. This second stage of separation is often desirable since some neutral and possibly even some paramagnetic glass particles may be mixed with the diamagnetic glass separated in the first stage. The second magnetic separator 40 further purifies the diamagnetic glass which can then be used inconventional glass making processes.

The other product from the separator 38 is a mixture of paramagnetic and neutral glass particles which are passed to another second stage separator 42. This separator is used to separate the paramagnetic glass particles from the neutral glass particles. The paramagnetic glass particles may be passed on to a third stage separator 44 which further purifies the paramagnetic glass. The neutral glass particles are passed to another third stage separator 46 which further purifies the neutral particles. In addition to the purified products, a mixture of paramagnetic, neutral, and diamagnetic glass particles is typically obtained from the second stage separator 40 and the two third stage separators 44 and 46. This material is recycled to the first stage separator 38 for another pass through the system.

It will be apparent that, if desired, additional stages of separation for further purification can be employed or that initial separation of the paramagnetic particles from a mixture of diamagnetic and neutral particles can be performed in a similar manner.

As an example of practice of this invention, a mixture of glass particles in the size range of from about 32 to 150 mesh was obtained by froth flotation of the glass from an inorganic fraction of typical municipal and household wastes. A primary amine was used as the flotation reagent. The floated product was magnetically cleaned in a conventional induced roll magnetic separator to remove ferro-magnetic impurities, the resulting mixture which was substantially entirely glass particles was fed down a smooth chute with longitudinal vibrations through a magnetic field having a strength gradient from one side of the chute to the other. With the conveyor tilted about one-half degree laterally, all of the glass particles came off the end of the chute on one side of the divider when the magnetic field is turned off. When the electromagnet is activated and the particles pass through the transverse magnetic field gradient, a pure fraction is obtained on the "uphill" side of the divider. When the chute is tilted up to about 1 degree in one direction, a portion of the green paramagnetic glass fragments are separated as a substantially pure fraction. When the chute is tilted in the opposite direction, a substantially pure fraction of flint glass is obtained. By repeating the operation on the mixed fractions after pure fractions are extracted, a substantial complete separation of green, clear and amber glass is obtained. It has been found that a maximum field strength of about 20,000 Gauss is more than adequate for a relatively clean separation. Higher strength fields will give separations at higher flow rates than weaker fields and, therefore, fields as high as feasible are preferred.

Many modifications and variations in practice of this invention will be apparent to one skilled in the art. Thus, for example, many different types of apparatus for combining the effects of magnetic and acceleration forces will be apparent to one skilled in the art. It is therefore to be understood that within the scope of the appended claims, the invention may be practiced otherwise than as specifically described.

What is claimed is:

1. A process for separating a mixture of particulate glasses of different colors comprising the steps of:

passing a mixture of glass particles having different magnetic susceptibilities and including paramagnetic green and diamagnetic flint glasses through a magnetic field having a relatively greater magnetic field strength nearer one side edge of the path of the glass particles and a relatively lower magnetic field strength nearer the other side edge of the path of the glass particles;

superimposing an acceleration force on the magnetic field, the acceleration force having a component transverse to the path of the glass particles from one side edge towards the other; and collecting a first fraction of glass particles having particles of glass including paramagnetic green glass from the side edge of the path subject to the greater magnetic field strength and a second fraction of glass particles including diamagnetic flint glass from the other side edge of the path which is subject to the lower magnetic field strength.

2. A process as defined in claim 1 wherein the step of superimposing comprises arranging the magnetic field and the acceleration force so that the magnetic field at least partially counteracts the acceleration force on glass particles having a non-neutral magnetic susceptibility.

3. A process as defined in claim 1 wherein the step of passing the mixture through a magnetic field comprises gravitationally moving the particles along a chute extending through the magnetic field and wherein the superimposing step comprises tilting the chute laterally relative to the horizontal.

4. A process as defined in claim 1 wherein the collecting step comprises separating a first fraction of predominately diamagnetic flint glass particles and a second fraction comprising a mixture of neutral amber and paramagnetic green glass particles.

5. A process as defined in claim 1 wherein the collecting step comprises separating a first fraction having predominantly paramagnetic green glass particles and a second fraction having a mixture of diamagnetic flint and neutral amber glass particles.

6. A process for separating a mixture of glass particles comprising a diamagnetic flint glass fraction and a non-diamagnetic glass fraction which comprises the steps of:
   passing the mixture through a magnetic field having a field strength gradient transverse to the path of the glass particles;
   providing an acceleration force component transverse to the direction of movement of the glass particles through the magnetic field and in the direction of the maximum magnetic force for separating the non-diamagnetic glass from the diamagnetic flint glass by the transverse acceleration force component and separating the diamagnetic flint glass from the non-diamagnetic glass by magnetic repulsion; and
   collecting the diamagnetic flint glass fraction and the non-diamagnetic glass fraction.

7. A process for separating a mixture of glass particles comprising a paramagnetic green glass fraction and a non-paramagnetic glass fraction which comprises the steps of:
   passing the mixture through a magnetic field having a field strength gradient transverse to the path of the particles;
   providing an acceleration force component transverse to the direction of movement of the glass particles through the magnetic field and in the direction opposite to the maximum magnetic force for separating the nonparamagnetic glass from the paramagnetic green glass by the transverse acceleration force component and separating the paramagnetic green glass from the nonparamagnetic glass by magnetic attraction; and
   collecting the paramagnetic green glass fraction and the non-paramagnetic glass fraction.

8. A process for separating a mixture of particulate glasses comprising magnetically neutral, paramagnetic green and diamagnetic flint glasses which comprises:
   feeding a mixture of particulate glasses comprising magnetically neutral, diamagnetic flint and paramagnetic green glass through a magnetic field having a magnetic force field gradient transverse to the path of the mixture of said particulate glasses through the field;
   forming within the magnetic field a predominately paramagnetic green glass fraction in the region of relatively stronger magnetic intensity;
   forming a glass fraction comprising predominately diamagnetic flint glass in the region of relatively weaker magnetic intensity;
   tilting the path of feed with respect to the horizontal and providing a lateral gravitational force component in the direction of the region of weakest magnetic intensity for combining the magnetically neutral glass with the diamagnetic particulate flint glass; and
   collecting the paramagnetic green glass fraction and the diamagnetic flint glass-magnetically neutral glass fraction separately.

9. A process as defined in claim 8 in which the mixture of particulate glass is fed through the magnetic field gravitationally.

10. A process for separating a mixture of particulate glasses comprising magnetically neutral, paramagnetic green and diamagnetic flint glasses which comprises:
   feeding a mixture of particualte glasses comprising magnetically neutral amber, diamagnetic flint and paramagnetic green glass through a magnetic field having a magnetic force field gradient transverse to the path of the mixture of said particulate glasses through the field;
   forming within the magnetic field a predominately paramagnetic green glass fraction in the region of relatively stronger magnetic intensity;
   forming a glass fraction comprising predominately diamagnetic flint glass in the region of relatively weaker magnetic intensity;
   tilting the path of feed with respect to the horizontal and providing a lateral gravitational force component in the direction of the region of greatest magnetic intensity for combining the magnetically neutral amber glass with the paramagnetic particulate green glass; and
   collecting the paramagnetic green-neutral amber glass fraction and the diamagnetic flint glass fraction separately.

11. A process as defined in claim 10 in which the mixture of particulate glass is fed through the magnetic field gravitationally.

* * * * *